(12) United States Patent
Uehara

(10) Patent No.: US 7,667,734 B2
(45) Date of Patent: Feb. 23, 2010

(54) LIQUID-CRYSTAL TELEVISION SET

(75) Inventor: Takuya Uehara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 776 days.

(21) Appl. No.: 11/331,853

(22) Filed: Jan. 13, 2006

(65) Prior Publication Data

US 2006/0187362 A1 Aug. 24, 2006

(30) Foreign Application Priority Data

Jan. 14, 2005 (JP) .......................... P2005-007488

(51) Int. Cl.
*H04N 17/00* (2006.01)
*H04N 17/02* (2006.01)
*H04N 5/445* (2006.01)
*H04N 5/50* (2006.01)
*H04N 3/14* (2006.01)

(52) U.S. Cl. ...................... 348/177; 348/180; 348/184; 348/189; 348/563; 348/569; 348/790

(58) Field of Classification Search ................. 348/177, 348/180, 184, 189, 569, 790, 791, 797
See application file for complete search history.

(56) References Cited

U.S. PATENT DOCUMENTS

| | | | | | |
|---|---|---|---|---|---|
| 4,672,275 | A | * | 6/1987 | Ando ..................... | 315/368.12 |
| 5,016,095 | A | * | 5/1991 | Kii .............................. | 348/806 |
| 5,216,504 | A | * | 6/1993 | Webb et al. ................. | 348/190 |
| 5,298,985 | A | * | 3/1994 | Tsujihara et al. ............ | 348/745 |
| 5,510,833 | A | * | 4/1996 | Webb et al. ................. | 348/190 |
| 5,532,765 | A | * | 7/1996 | Inoue et al. ................. | 348/807 |
| 5,576,774 | A | * | 11/1996 | Hosoi et al. ................. | 348/745 |
| 5,657,079 | A | * | 8/1997 | Thario et al. ................ | 348/190 |
| 5,671,025 | A | * | 9/1997 | Ryu ........................... | 348/745 |
| 5,739,809 | A | * | 4/1998 | McLaughlin et al. ........ | 345/594 |

(Continued)

FOREIGN PATENT DOCUMENTS

JP 64-70796 3/1989

(Continued)

OTHER PUBLICATIONS

Japanese Office Action for Japanese Application No. 2005-007488, mailed on Oct. 24, 2007 (3 pages).

(Continued)

*Primary Examiner*—Brian P Yenke
(74) *Attorney, Agent, or Firm*—Osha • Liang LLP

(57) ABSTRACT

A single IC-chip includes a video processor, a panel processor, an OSD circuit, a CPU, and a timing controller. A memory 18 stores one test pattern datum that is formed of one font datum of X dots in width and Y dots in height in order to test the position of any bright point, dark point, bright line or dark line on the screen of the liquid crystal panel. At a test step, the CPU acquires the test pattern datum from the memory, and a test pattern is created by the OSD circuit so as to display the test pattern at any desired position on the screen of the liquid crystal panel and to simultaneously display the address values of the origin of the display position of the test pattern.

5 Claims, 3 Drawing Sheets

U.S. PATENT DOCUMENTS

| | | | |
|---|---|---|---|
| 6,020,919 A * | 2/2000 | Fujii et al. | 348/190 |
| 6,281,950 B1 * | 8/2001 | Webb et al. | 348/807 |
| 6,307,575 B1 * | 10/2001 | Matsushita | 715/788 |
| 6,686,953 B1 * | 2/2004 | Holmes | 348/179 |
| 6,700,627 B2 * | 3/2004 | Yang et al. | 348/674 |
| 6,717,625 B1 * | 4/2004 | Thielemans | 348/745 |
| 6,741,277 B1 * | 5/2004 | Rau | 348/181 |
| 6,975,349 B2 * | 12/2005 | Overton | 348/180 |
| 7,388,623 B2 * | 6/2008 | Uehara | 348/790 |
| 7,405,723 B2 * | 7/2008 | Kang et al. | 345/156 |
| 7,479,982 B2 * | 1/2009 | Otani et al. | 348/188 |

FOREIGN PATENT DOCUMENTS

| | | |
|---|---|---|
| JP | 11-272222 | 10/1999 |
| JP | 2002-140061 | 5/2002 |
| JP | 3104481 | 7/2004 |

OTHER PUBLICATIONS

Patent Abstracts of Japan, Publication No. 2002-140061, Publication Date May 17, 2002, 2 pages.

English language translation of JP-2002-140061, Publication Date May 17, 2002, 26 pages.

Patent Abstracts of Japan, Publication No. 11-272222, Publication Date Oct. 8, 1999, 2 pages.

* cited by examiner

PRIOR ART

LIQUID-CRYSTAL TELEVISION SET

TECHNICAL FIELD

The present invention relates to a liquid-crystal television set, and more particularly to a liquid-crystal television set wherein at least a video processor to which an analog data signal is inputted, a panel processor, an OSD circuit, a CPU, and a timing controller that controls the liquid-crystal drive portions of a liquid crystal panel are implemented in a single IC-chip.

BACKGROUND

Heretofore, various techniques have been adopted for specifying the position of any bright point, dark point, bright line or dark line which is the improper part of a liquid crystal panel.

As an example, the simplest technique is a technique wherein dimensions from the ends of a screen to the improper part are measured on the screen, and the address values of the improper part are specified by comparing the resulting measured values with the values of an address conversion table prepared beforehand. Since this technique does not require any special contrivance for specifying the improper part, it is advantageous in cost. The technique, however, has had the problem that accurate address values are not always obtained on account of dimensional measurement errors, etc.

On the other hand, there has been employed a technique wherein, as shown in FIG. 5, a cross-cursor screen in which one vertical line and one horizontal line intersect in the shape of a cross and which displays the coordinate values of an intersection point is displayed on the screen of the liquid crystal panel. More specifically, the address values of the improper part (crosspoint) are read from the screen in such a way that the vertical line and/or horizontal line of a cross cursor are/is moved every pixel (every dot) by appropriately manipulating upper, lower, left and right manipulation keys, until the intersection point (crosspoint) is superposed on the improper part.

The function of displaying such a cross-cursor screen is a function which is already incorporated in a pattern generator commercially available. This function, however, is very expensive and is unsuitable for reduction in cost.

Meanwhile, an OSD (on-screen display) circuit for presenting various displays is mounted in the liquid-crystal television set or the like. When the OSD circuit is used, information for enhancing a display quality can be offered by adjusting parameters, for example, contrast, brightness, sizes in vertical/horizontal directions, and a geometrical shape. A configurational example of the OSD circuit for offering such information is disclosed in, for example, JP-A-2002-140061.

Also, there has been proposed an image display apparatus wherein, in case of testing the defects or the likes of the liquid crystal panel, the set values of registers in a control circuit are altered, whereby a test pattern to be displayed is altered (refer to, for example, JP-A-11-272222). Concretely, seven registers AAA-GGG are employed. By way of example, when the set value of the register AAA is altered from "000" to "055", the set value of the register DDD from "005" to "042", and the set value of the register FFF from "033" to "063", the display is altered from a standard pattern to any desired test pattern. In this case, the set values of the registers are altered by control signals stored in the memory of a microcomputer beforehand, thereby to omit the labor of individually setting and altering the values of the registers. Besides, the test pattern is created by utilizing a pattern generator function which the control circuit has.

SUMMARY OF THE INVENTION

In the technique disclosed in JP-A-11-272222, however, it is required for switching and displaying a plurality of test patterns to prepare the plurality of registers and to endow the control circuit with the pattern generator function for creating the test patterns. The requirements have led to the problems of a high price and a complicated circuit arrangement.

Meanwhile, in a recent electronic equipment, a plurality of functional blocks are implemented in a single IC-chip, thereby to attain the miniaturizations of components and to attain the reduction of a manufacturing cost. Also in a liquid-crystal television set, therefore, a smaller size and a lower price are attained in such a way that a video processor to which an analog data signal is inputted, a panel processor, an OSD circuit, a CPU, and a timing controller which controls the liquid-crystal drive portions of a liquid crystal panel are implemented in the single IC-chip.

On the other hand, when the functional blocks from the video processor to which the analog data signal is inputted, to the timing controller which controls the drive portions of the liquid crystal panel are implemented in the single IC-chip in this manner, a digital data signal cannot be directly inputted to the timing controller.

For this reason, a problem to be stated below has been involved. In a case where the test pattern for testing the improper part (such as bright point, dark point, bright line or dark line) of the liquid crystal panel is displayed at, for example, a test step which is the final step of a manufacturing process for a liquid-crystal television set or a repair step which complies with a repair request made by a user, the improper part has hitherto been specifiable by externally connecting the dedicated test apparatus and then causing the OSD circuit to display the cross-cursor screen digitally created, on the liquid crystal panel. In contrast, an adjustment employing such a cross-cursor screen becomes impossible for the above reason.

In this case, in the single IC-chip implementation as stated above, it is also considered that the cross-cursor screen is digitally created by the internal OSD circuit by using the analog data signal inputted to the video processor. In the creation from the analog data signal, however, a waveform becomes dull, and hence, a sharp cross-cursor screen (crosspoint pattern) in which the color (white or black) of only one line is inverted in each of the vertical and horizontal directions cannot be created.

Accordingly, the test pattern needs to be created within the single IC-chip and then displayed without using such an analog data input signal. In this case, when the cross-cursor screen which moves each of the vertical line and the horizontal line every pixel is to be created, it is necessary to create crosspoint patterns in the number of the pixels (dots) of the liquid crystal panel, and to save the created crosspoint patterns in an internal memory. This poses the problem that the capacity of the memory becomes large.

The present invention provides a liquid-crystal television set wherein a video processor to which an analog data signal is inputted, a panel processor, an OSD circuit, a CPU, and a timing controller which controls the liquid-crystal drive portions of a liquid crystal panel are implemented in a single IC-chip, the liquid-crystal television set permitting the address values of the improper part (bright point, dark point, bright line, dark line or the like) of the liquid crystal panel to be easily specified at a low cost, by displaying a test pattern of simple configuration on the screen of the liquid crystal panel at the test step or repair-step of the liquid-crystal television set.

A liquid-crystal television set including: a video processor to which an analog data signal is inputted; a panel processor; an OSD circuit; a CPU; a timing controller that controls a drive unit provided on a liquid crystal panel; and a memory that is configured as either one of an EEPROM and a flash memory, and is externally mounted, the memory storing a test pattern datum that is configured as a font datum of 16 dots in width and 20 dots in height, and has display color invertedly highlighted every fifth dot in both the heightwise direction and the widthwise direction, for testing a position of any improper part including any one of bright point, dark point, bright line and dark line on a screen of the liquid crystal panel, wherein the video processor, the panel processor, the OSD circuit, the CPU, and the timing controller are implemented in a single IC-chip, and wherein the CPU acquires the test pattern datum from the memory and controls the OSD circuit to create a test pattern to be displayed at any desired position on the screen of the liquid crystal panel and to display address values of an origin of the position where the test pattern is displayed, when testing the liquid crystal panel.

A liquid-crystal television set including: a video processor to which an analog data signal is inputted; a panel processor; an OSD circuit; a CPU; a timing controller that controls a drive unit provided on a liquid crystal panel; and a memory that stores a test pattern datum that is configured as a font datum of X dots in width and Y dots in height, for testing a position of any improper part on a screen of the liquid crystal panel, wherein the video processor, the panel processor, the OSD circuit, the CPU, and the timing controller are implemented in a single IC-chip, and wherein the CPU acquires the test pattern datum from the memory and controls the OSD circuit to create a test pattern to be displayed at any desired position on the screen of the liquid crystal panel and to display address values of an origin of the position where the test pattern is displayed, when testing the liquid crystal panel.

DETAILED DESCRIPTION

Now, an embodiment of the present invention will be described with reference to the drawings.

Figure 1:
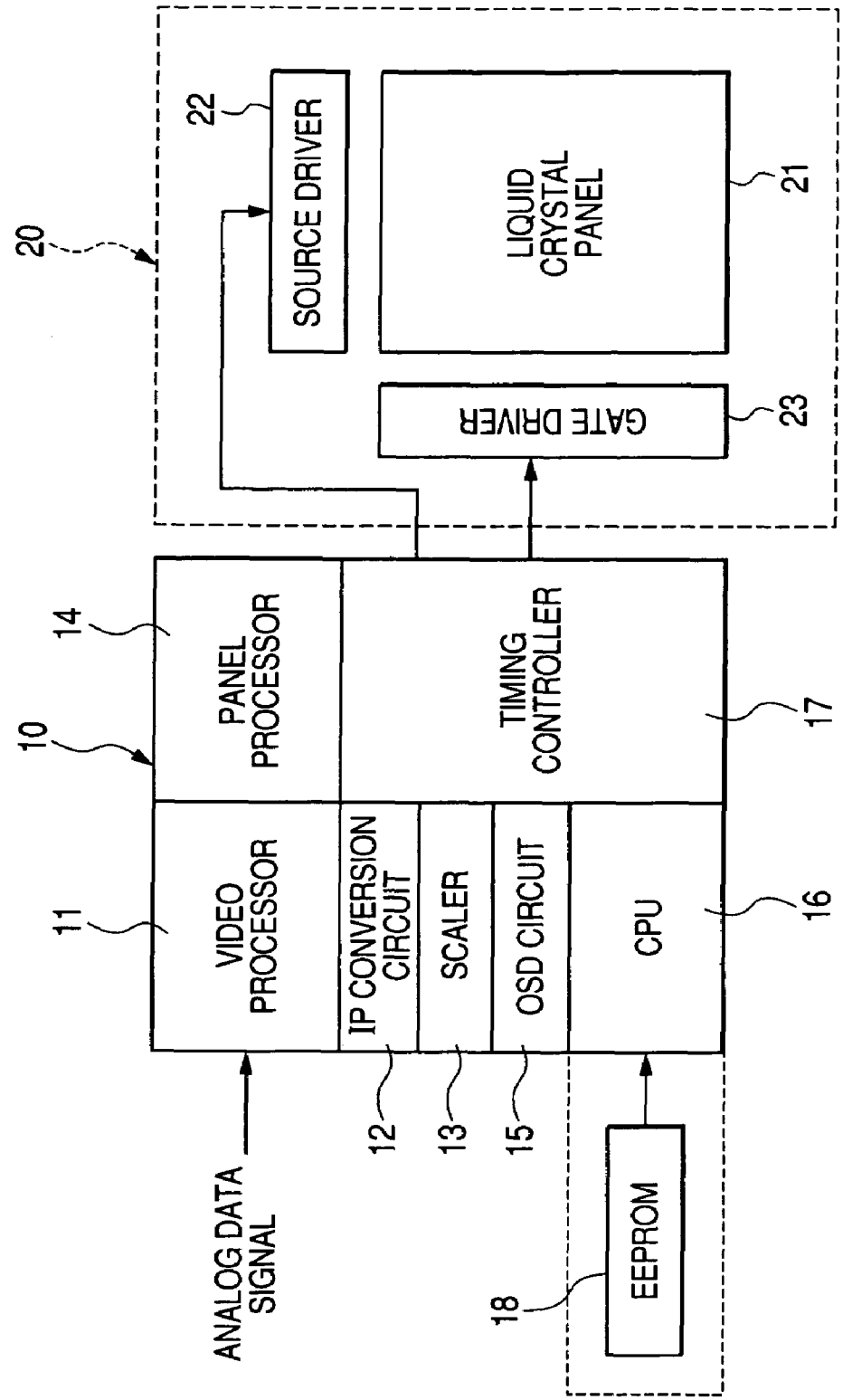
FIG. 1 is a functional block diagram showing the configuration of the principal portions of a liquid-crystal television set.

FIG. 1 is a functional block diagram showing the configuration of the principal portions of a liquid-crystal television set according to the embodiment.

The liquid-crystal television set includes a single IC-chip 10 and a liquid-crystal panel (LCD panel) module 20.

The liquid-crystal panel module 20 includes a liquid crystal panel 21 in which TFTs for driving liquid crystal cells are formed at the respective intersection parts between a plurality of source lines that are fed with data, and a plurality of gate lines that are fed with scan signals, a source driver 22 which serves to feed the data to the source lines, and a gate driver 23 which serves to feed the scan signals (pulses) to the gate lines.

The single IC-chip 10 includes a video processor 11 to which an analog data signal is inputted, an IP conversion circuit (scan-line conversion function portion) 12 which converts an inputted video signal of interlace scheme into a progressive scheme, a scaler 13 which Serves to adapt a progressive image to a panel resolution, a panel processor 14, an OSD circuit 15, a CPU 16, and a timing controller 17 which feeds control signals to the source driver 22 and the gate driver 23, respectively.

The single IC-chip 10 is furnished with an EEPROM in the embodiment, as a memory 18 which is externally mounted. The EEPROM 18 stores therein one simple test pattern datum for specifying the position (address values) of any bright point, dark point, bright line or dark line which is the improper part of the liquid crystal panel 21.

Figure 2:
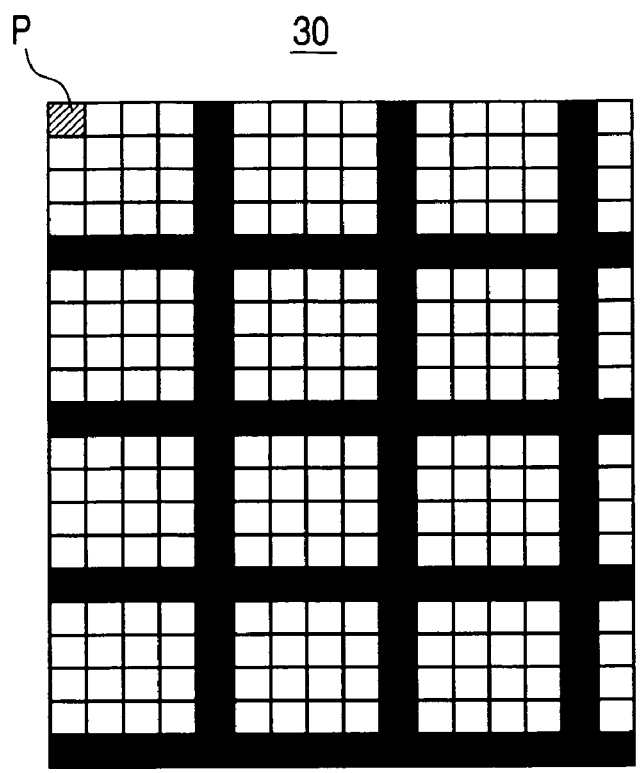
FIG. 2 is an explanatory diagram showing a configurational example of a test pattern.

FIG. 2 shows an example of a test pattern 30 which is created in software fashion by the OSD circuit 15 in accordance with the test pattern datum stored in the EEPROM 18.

In the embodiment, it is assumed that one character (font) is formed in units of 16 dots in width and 20 dots in height (16' 20 dots). The test pattern 30 is formed of 16 dots in width and 20 dots in height in correspondence with one character.

The test pattern 30 is such that display colors are invertedly highlighted every fifth line in a heightwise direction and a widthwise direction. In FIG. 2, the test pattern 30 has a checker-patterned shape which is divided every fifth dot as a whole, and in which the whole test pattern 30 is displayed in white, while one line of every fifth line in the heightwise direction and the widthwise direction is displayed in black.

Figure 3:
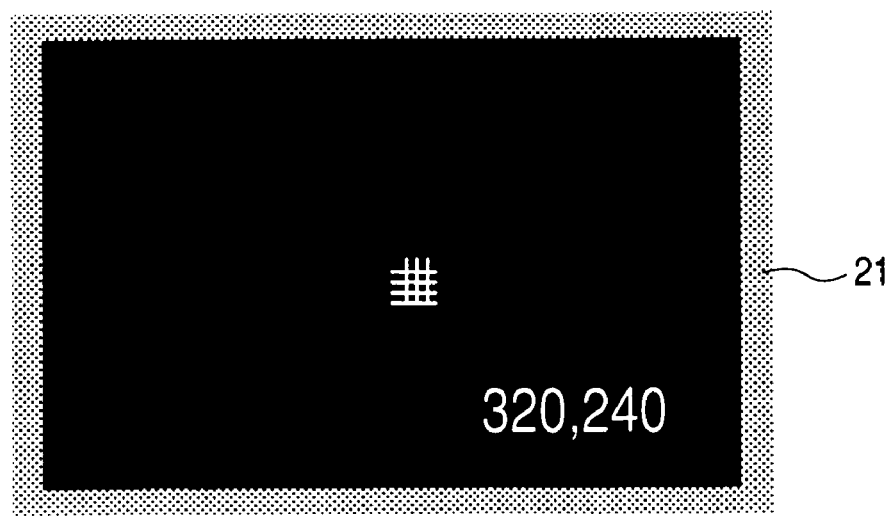
FIG. 3 is an explanatory diagram showing an example in which the test pattern is displayed on the screen of a liquid crystal panel.
Figure 5:
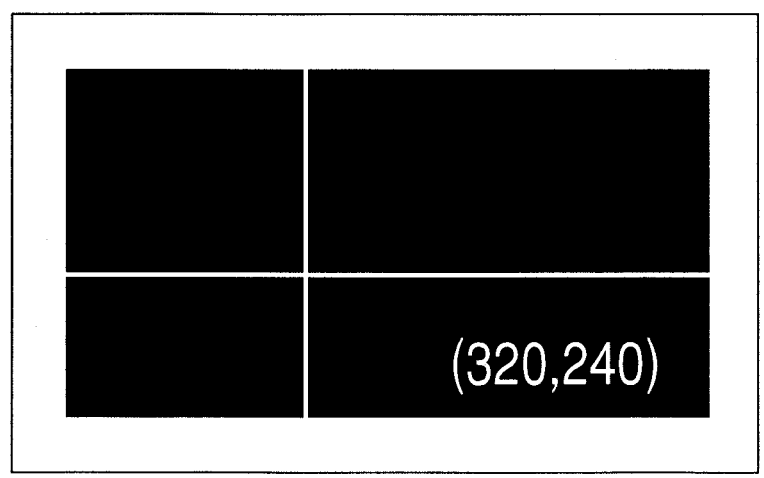
FIG. 5 is an explanatory diagram showing an example of a cross-cursor screen which is an example of a test pattern in the prior art.

FIG. 3 shows an example in the state where the test pattern 30 is displayed on the screen of the liquid crystal panel 21. In the display state, the whole screen of the liquid crystal panel 21 is displayed in black, and the test pattern 30 is displayed by inverting the white parts and black parts shown in FIG. 2 (that is, the whole pattern is displayed in black, while each line is displayed in white). On this occasion, the address values (X-value and Y-value) of the origin P at, for example, the left upper corner of the test pattern 30 are displayed on the screen. In the example shown in FIG. 3, the address of the origin is (320, 240). In the embodiment, the test pattern 30 is used as a substitute for the prior-art cross-cursor screen (cross-point pattern) shown in FIG. 5.

More specifically, in a case where the improper part of the liquid crystal panel 21 is specified at the final test step of a manufacturing process or at a repair step, the test pattern 30 is displayed on the screen of the liquid crystal panel 21 so as to include the improper part. On this occasion, the address values (X-value and Y-value) of the origin P at the left upper corner of the test pattern are displayed on the screen. Therefore, a person in charge of a test can easily obtain the address values of the improper part (for example, dark point) by counting the position of the improper part within the test pattern 30, in the widthwise direction (X-direction) and heightwise direction (Y-direction) from the origin P. In this case, the display colors are inverted every fifth line within the test pattern 30 (that is, the whole test pattern 30 is displayed in the checker-patterned shape in which it is divided every fifth dot). Therefore, the lines in the inverted color serve as criteria for counting the position of the improper part, and the number of dots from the origin P to the improper part can be easily counted.

Figure 4:
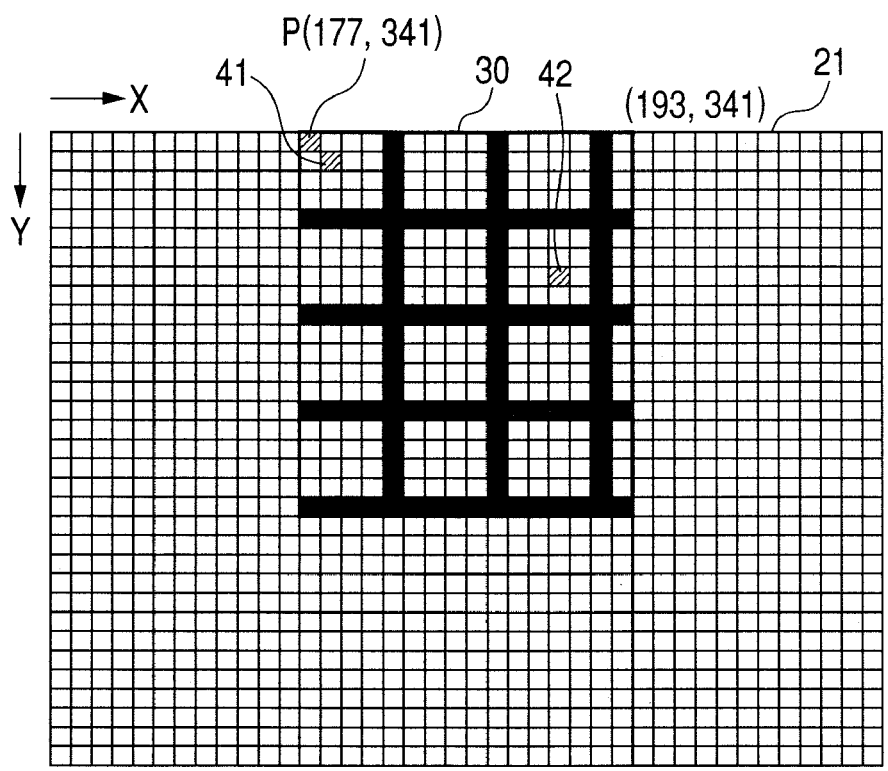
FIG. 4 is an explanatory diagram showing an example in which the addresses of improper parts within the test pattern are specified.

FIG. 4 exemplifies a case where the address values of bright points within the test pattern 30 are specified.

In this example, the origin P of the test pattern 30 displayed on the screen of the liquid crystal panel 21 lies at (177, 341). The address values (193, 341) of the next origin of the test pattern in the case of shifting the test pattern 30 rightward in correspondence with one character are also displayed in FIG. 4, but the display is not always necessary.

Here, it is assumed that positions indicated at numerals 41 and 42 in FIG. 4 are the bright points. Then, the bright point 41 lies at one dot rightward (in the X-direction) and one dot downward (in the Y-direction) with respect to the origin (177, 341) of the test pattern 30, so that the address of the bright point 41 becomes (177+1, 341+1)=(178, 342). Besides, the bright point 42 lies at 12 dots rightward (in the X-direction) and 7 dots downward (in the Y-direction) with respect to the origin (177, 341) of the test pattern 30, so that the address of the bright point 42 becomes (177+12, 341+7)=(189, 348).

Incidentally, in the example shown in FIG. 4, the whole test pattern 30 is displayed in white, and each line is displayed in black. On this occasion, in a case, for example, where a dark point exists on the line of the black display, it cannot be confirmed. In this case, accordingly, the display colors of the test pattern 30 as are white and black may be inverted so as to display the whole pattern in black and to display each line in white. Thus, the dark point is displayed as a black dot on the white line, and the position of the dark point can therefore be counted.

Incidentally, in the embodiment, the test pattern 30 is configured of 16 dots in width and 20 dots in height, but the invention is not always restricted to the numbers of the dots. By way of example, the width may well be divided in units of 15 dots which are divisible by 5 dots. Besides, the whole pattern may well be configured of, for example, 32 dots in width and 40 dots in height though a counting operation becomes more laborious.

Although the EEPROM is employed as the externally-mounted memory 18 in the embodiment, this EEPROM is not restrictive, but a flash memory, for example, is also usable. Further, the memory 18 need not always be externally mounted, but it may well be included in the single IC-chip 10 as indicated by a broken line in FIG. 1.

As described above with reference to the embodiment, there is provided a liquid-crystal television set having a video processor to which an analog data signal is inputted, a panel processor, an OSD circuit, a CPU, and a timing controller which controls the liquid-crystal drive portions of a liquid crystal panel, all of which being implemented in a single IC-chip, and a memory is provided which stores therein one test pattern datum formed of one font (character) datum of X dots in width and Y dots in height. In specifying the improper part of the liquid crystal panel, the test pattern is displayed on the screen of the liquid crystal panel so as to include the improper part, and the address values of the improper part can be easily obtained in such a way that the number of dots from the address values (X-value and Y-value) of the origin of the test pattern at, for example, the left upper corner thereof, to the position of the improper part in the test pattern is counted in the widthwise direction (X-direction) and heightwise direction (Y-direction). In this case, since the whole test pattern is displayed as divisions of squares each being of 5 dots in height and 5 dots in width, the lines of the divisions serve as criteria in the case of counting the position of the improper part, and the number of dots from the origin to the improper part can be counted easily and reliably. Further, since the test pattern to be stored may be only one test pattern formed of one font (character) datum, it can be fabricated at a low cost, and in turn, the liquid-crystal television set in which the test pattern is installed can be inexpensively provided to a user.

Although the present invention has been shown and described with reference to the embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A liquid-crystal television set comprising:
a video processor to which an analog data signal is inputted; a panel processor; an OSD circuit;
a CPU;
a timing controller that controls a drive unit provided on a liquid crystal panel; and
a memory that is configured as either one of an EEPROM and a flash memory, and is externally mounted, the memory storing a test pattern datum that is configured as a font datum of 16 dots in width and 20 dots in height, and has display color invertedly highlighted every fifth dot in both the heightwise direction and the widthwise direction, for testing a position of any improper part including any one of bright point, dark point, bright line and dark line on a screen of the liquid crystal panel,
wherein the video processor, the panel processor, the OSD circuit, the CPU, and the timing controller are implemented in a single IC-chip, and
wherein the CPU acquires the test pattern datum from the memory and controls the OSD circuit to create a test pattern to be displayed at any desired position on the screen of the liquid crystal panel and to display address values of an origin of the position where the test pattern is displayed, when testing the liquid crystal panel.

2. A liquid-crystal television set comprising:
a video processor to which an analog data signal is inputted; a panel processor; an OSD circuit;
a CPU;
a timing controller that controls a drive unit provided on a liquid crystal panel; and
a memory that stores a test pattern datum that is configured as a font datum of X dots in width and Y dots in height, for testing a position of any improper part on a screen of the liquid crystal panel,
wherein the video processor, the panel processor, the OSD circuit, the CPU, and the timing controller are implemented in a single IC-chip, and
wherein the CPU acquires the test pattern datum from the memory and controls the OSD circuit to create a test pattern to be displayed at any desired position on the screen of the liquid crystal panel and to display address values of an origin of the position where the test pattern is displayed, when testing the liquid crystal panel,
wherein the improper part includes at least one of a bright point, a dark point, a bright line and a dark line on the screen of the liquid crystal panel, and
wherein the test pattern has a checker patterned shape.

3. The liquid-crystal television set according to claim 2, wherein the test pattern is displayed on the screen of the liquid crystal panel with display color invertedly highlighted every predetermined line in each of a heightwise direction and a widthwise direction.

4. A liquid-crystal television set comprising:
a video processor to which an analog data signal is inputted; a panel processor; an OSD circuit;
a CPU;
a timing controller that controls a drive unit provided on a liquid crystal panel; and
a memory that stores a test pattern datum that is configured for testing a position of any improper part on a screen of the liquid crystal panel,
wherein the video processor, the panel processor, the OSD circuit, the CPU, and the timing controller are implemented in a single IC-chip, and
wherein the CPU acquires the test pattern datum from the memory and controls the OSD circuit to create a test pattern to be displayed at any desired position on the screen of the liquid crystal panel and to display address values of an origin of the position where the test pattern is displayed, when testing the liquid crystal panel,
wherein the test pattern is formed of one font datum of 20 dots in height and 16 dots in width, and has display color invertedly highlighted every fifth dot in both the heightwise direction and the widthwise direction.

5. The liquid-crystal television set according to claim 2, wherein the memory is configured as either one of an EEPROM and a flash memory, and is externally mounted.

* * * * *